(12) United States Patent
Kasiviswanathan

(10) Patent No.: US 11,410,539 B2
(45) Date of Patent: Aug. 9, 2022

(54) INTERNET OF THINGS (IOT) BASED INTEGRATED DEVICE TO MONITOR AND CONTROL EVENTS IN AN ENVIRONMENT

(71) Applicant: Sixth Energy Technologies PVT Ltd., Karnataka (IN)

(72) Inventor: Rangarajan Kasiviswanathan, Karnataka (IN)

(73) Assignee: Sixth Energy Technologies PVT Ltd., Karnataka (IN)

( * ) Notice: Subject to any disclaimer, the term of this patent is extended or adjusted under 35 U.S.C. 154(b) by 0 days.

(21) Appl. No.: 16/633,867

(22) PCT Filed: Aug. 28, 2017

(86) PCT No.: PCT/IB2017/055148
§ 371 (c)(1),
(2) Date: Jan. 24, 2020

(87) PCT Pub. No.: WO2019/021041
PCT Pub. Date: Jan. 31, 2019

(65) Prior Publication Data
US 2020/0211364 A1    Jul. 2, 2020

(30) Foreign Application Priority Data
Jul. 25, 2017   (IN) .............................. 201741026342

(51) Int. Cl.
*G08B 29/00*      (2006.01)
*G08B 29/02*      (2006.01)
*G08B 29/04*      (2006.01)
(Continued)

(52) U.S. Cl.
CPC ........... *G08B 29/188* (2013.01); *G06V 20/40* (2022.01); *G08B 13/1966* (2013.01);
(Continued)

(58) Field of Classification Search
USPC ............................. 348/143, 61, 155, 157, 73
See application file for complete search history.

(56) References Cited

U.S. PATENT DOCUMENTS 6,697,757 B2   2/2004   Eckel
7,102,504 B2   9/2006   Kates
(Continued)

*Primary Examiner* — Daquan Zhao
(74) *Attorney, Agent, or Firm* — Elmore Patent Law Group, P.C.; Carolyn S. Elmore; Joseph C. Zucchero

(57) ABSTRACT

The present disclosure relates to real-time surveillance/monitoring of an environment using an Internet of Things (IoT) based integrated device. The integrated device comprises replaceable sensors and programmable image/video capturing device, that are communicatively connected to a processor. The processor correlates sensor data and data related to the images, audios and videos received from the replaceable sensors and the programmable image/video capturing device to validate occurrence of event in the environment. Later, information related to the validated events are transmitted to edge nodes, cloud servers, user devices or other sensor nodes for effective monitoring of occurred events. The integration of programmable image/video capturing device with the replaceable sensors helps in reducing chances of false event detection, as well as allows users to program the image capturing device for detection of various events. Also, integration of various sensors helps in reducing electrical wirings and overall complexity of the device.

36 Claims, 4 Drawing Sheets

(51) Int. Cl.
*G08B 29/16* (2006.01)
*G08B 29/18* (2006.01)
*G08B 13/196* (2006.01)
*G08B 19/00* (2006.01)
*H04N 5/225* (2006.01)
*H04N 5/247* (2006.01)
*H04N 7/18* (2006.01)
*G06V 20/40* (2022.01)
*G16Y 40/00* (2020.01)
*G16Y 30/00* (2020.01)
*G16Y 20/00* (2020.01)
*G16Y 20/10* (2020.01)
*G16Y 10/80* (2020.01)
*G16Y 40/10* (2020.01)
*G16Y 40/50* (2020.01)

(52) U.S. Cl.
CPC ....... *G08B 13/19663* (2013.01); *G08B 19/00* (2013.01); *H04N 5/2253* (2013.01); *H04N 5/247* (2013.01); *H04N 7/181* (2013.01); *G06V 20/44* (2022.01); *G16Y 10/80* (2020.01); *G16Y 20/10* (2020.01); *G16Y 40/10* (2020.01); *G16Y 40/50* (2020.01)

(56) References Cited

U.S. PATENT DOCUMENTS

| | | | |
|---|---|---|---|
| 8,010,631 B2* | 8/2011 | Brailean | H04L 67/125 709/219 |
| 9,143,739 B2* | 9/2015 | Murphy | H04N 9/8042 |
| 2009/0167862 A1* | 7/2009 | Jentoft | G08B 13/19695 348/143 |
| 2015/0061870 A1 | 3/2015 | Hamilton | |
| 2015/0237479 A1 | 8/2015 | Fung et al. | |
| 2015/0318015 A1* | 11/2015 | Bose | A63F 13/212 386/248 |
| 2016/0321892 A1* | 11/2016 | Divakara | G08B 13/19645 |
| 2017/0171607 A1* | 6/2017 | Britt | H04N 21/6125 |

* cited by examiner

INTERNET OF THINGS (IOT) BASED INTEGRATED DEVICE TO MONITOR AND CONTROL EVENTS IN AN ENVIRONMENT

TECHNICAL FIELD

The present subject matter is related, in general to real-time monitoring devices and more particularly, but not exclusively to an Internet of Things (IoT) based integrated device for monitoring and controlling one or more events in an environment.

BACKGROUND

Presently, environments like commercial buildings, office space, retail outlets, small shops, medium and high-end residences, unmanned kiosks, telecom towers, Bank ATM locations, Bank branches, Insurance company offices, financial institutions, government offices or jewelry shops are configured with some sort of monitoring devices like smoke sensors, energy meters, door sensors, person movement sensors, surveillance cameras etc. for monitoring various events in these surroundings. At present, alarms and indications are generated locally by the monitoring devices and are not notified to the concerned persons in real-time over a wide area network. For example, in case of a fire event in a retail shop at night when no one is around, the shop owner would be notified about the fire event only after the intensity of the fire has increased or only when the shop owner visits the shop after the fire event has taken place.

Further, almost all monitoring devices that are in existence today are independent in nature and they are deployed independently and connected to a controller through multiple wires or wireless connections. This would increase the number of sensors deployed in a room along with increased number of electric wiring and connections. This in turn would lead to higher cost of ownership, unattractive aesthetics due to many sensors installed in a room, lower reliability due to wiring issues and more complexity. Further, presently there are no means to communicate with these monitoring devices directly without communicating through their respective controllers. Also, none of these monitoring devices can be configured for various applications, thereby limiting their use to specific applications.

Additionally, in cases where the surveillance cameras and image and/or video capturing devices are used for monitoring the environment, the images and videos captured by those devices must be transmitted to edge nodes or cloud servers for analytics and correlation. However, transmitting substantial number of images and videos to these external nodes on a regular basis would consume lot of network resources and thus, is not efficient.

SUMMARY

Disclosed herein is an Internet of Things (IoT) based integrated device to monitor and control one or more events in an environment. The integrated device comprises one or more replaceable sensors to detect the one or more events in the environment. The integrated device also comprises at least one programmable image or video capturing device, interfaced with the one or more replaceable sensors, to capture one or more images and videos of the environment in real-time. Further, the integrated device comprises a processor. The processor is communicatively connected to each of the one or more replaceable sensors and the at least one programmable image or video capturing device. Furthermore, the integrated device comprises a memory that is communicatively coupled to the processor. The memory stores processor-executable instructions, which on execution, causes the processor to receive sensor data and data related to the one or more images and videos related to the one or more events from the one or more replaceable sensors and the at least one programmable image or video capturing device respectively. Upon receiving the data, the processor correlates the sensor data with the data related to the one or more images and videos using one or more correlation rules to validate occurrence of the one or more events. Finally, the processor transmits information related to the one or more events being validated to at least one of an edge node, cloud server or one or more sensor nodes associated with the integrated device or a user device.

Further, the present disclosure discloses a method for monitoring and controlling one or more events in an environment. The method comprises receiving, by a processor of an integrated device, sensor data and data related to the one or more images and videos related to the one or more events from one or more replaceable sensors and at least one programmable image or video capturing device respectively. The one or more replaceable sensors are configured to detect the one or more events in the environment. Also, at least one programmable image or video capturing device is interfaced with the one or more replaceable sensors and is configured to capture one or more images and videos of the environment in real-time. Upon receiving the data, the method comprises correlating the sensor data with the data related to the one or more images and videos using one or more correlation rules for validating occurrence of the one or more events. Based on the validation of occurrence of the one or more events, the method further comprises transmitting information related to the one or more events being validated to at least one of an edge node, cloud server or one or more sensor nodes associated with the integrated device or one or more user devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
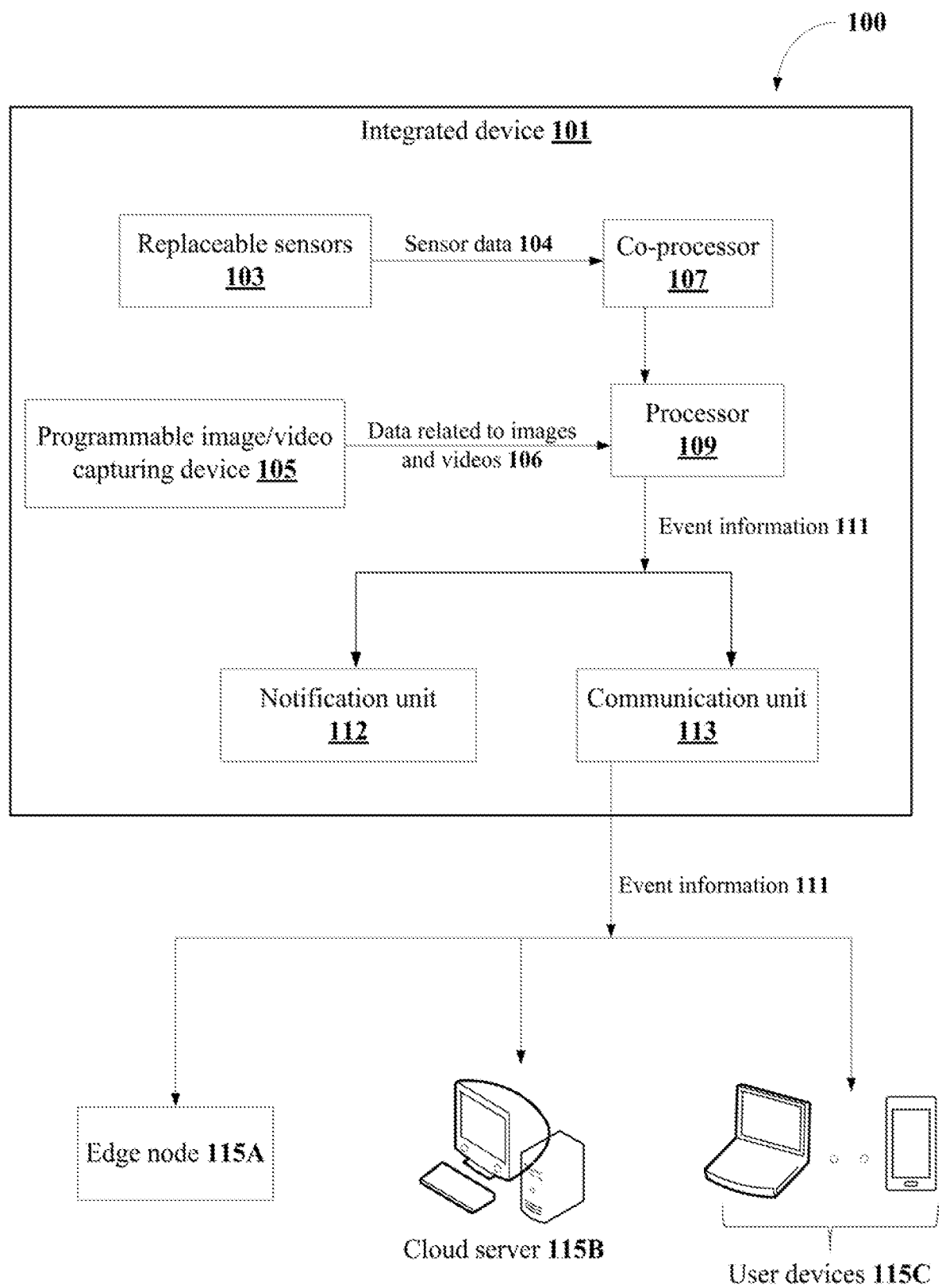
FIG. 1 shows an exemplary environment comprising an integrated device for monitoring and controlling one or more events in the environment in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure is related to an integrated device, which is an IoT sensor that integrates the functionality of a controller and various event monitoring sensors such as programmable image/video capturing device, a smoke detection sensor, a Passive Infrared (PIR) sensor, an alarm, an air conditioning IR controller, an IR code learner, a Low Power Wireless (LPW) access point, a temperature sensor, a basic Network Video Recorder (NVR), a humidity sensor, a light level detection sensor, a noise detection sensor, a microphone and a speaker, and other similar sensors in a single unit.

In an embodiment, the integrated device can integrate each of the above event monitoring sensors into a single sensor assembly, which is controlled by a controller, using a configurable logic. The programmable image/video capturing device may be made smart by integrating various image analytics functions on the programmable image/video capturing device. Further, each communication interface, controller functionality, sensors and actuators are integrated into the integrated device, thereby reducing cost of ownership and deployment, improving reliability, enabling easy installation, and commissioning of sensors, and tremendously improving aesthetics of the environment.

The present disclosure discloses concept of integrating at least one programmable image/video capturing device with the sensor assembly so that the programmable image/video capturing device can act like a door sensor, smoke sensor, fire sensor, occupancy sensor and other similar sensors, in addition to capturing images and/or recording videos of the environment. This provides proof and improves reliability of performance of the sensor assembly since the events detected by the event monitoring sensors can be cross-verified based on the images and/or videos recorded by the programmable image/video capturing device. For example, even if the smoke sensor fails to detect presence of smoke in the environment, the programmable image/video capturing device may detect the presence of smoke based on image analytics configured in the programmable image/video capturing device.

In the following detailed description of the embodiments of the disclosure, reference is made to the accompanying drawings that form a part hereof, and which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment 100 comprising an integrated device 101 for monitoring and controlling one or more events in the environment 100 in accordance with some embodiments of the present disclosure.

In an embodiment, the environment 100 may be any user surroundings such as a commercial building, an office space, a retail outlet, small shops, medium and high-end residences, unmanned kiosks, telecom towers, Bank ATMs, Insurance company offices, financial institutions, government offices, jewelry shops, and the like, which require continuous surveillance/monitoring. In an implementation, the integrated device 101 comprises one or more replaceable sensors 103 for monitoring and controlling one or more events occurring in the environment 100. As an example, the one or more events that may occur in the environment 100 may include, without limiting to, occurrence of fire/smoke in the environment 100, theft, burglary, or intrusion in the environment 100 or any unexpected variations in normal conditions of the environment 100. Further, the one or more replaceable sensors 103 may include, without limiting to, a smoke detection sensor, a fire detection sensor, a Passive Infrared (PIR) sensor, air condition controlling module, a temperature sensor, a humidity sensor, a noise sensor, a door sensor, an occupancy detection sensor, a light sensor, or a motion sensor.

In an embodiment, each of the one or more replaceable sensors 103 may be communicatively connected to a processor 109 in the integrated device 101 for receiving one or more instructions from the processor 109 and to transmit sensor data 104 to the processor 109. In some implementations, the one or more replaceable sensors 103 may be dynamically detached and/or replaced from the integrated device 101 based on the application of monitoring and nature of the environment 100. Similarly, a user may dynamically attach/add and interface one or more new sensors with the already existing one or more replaceable sensors 103 in the integrated device 101 based on the requirement of monitoring and nature of the environment 100.

Further, the integrated device 101 comprises at least one programmable image/video capturing device 105 for capturing one or more images and videos of the one environment 100. As the name indicates, the at least one programmable image/video capturing device 105 may be programmed to perform one or more predetermined operations. As an example, the programmable image/video capturing device 105 may be configured to perform image analytics of the one or more images of the environment 100 for detecting occurrence of one or more events in the environment 100. An advantage of integrating the programmable image/video capturing device 105 within the integrated device 101 is that, each of the one or more captured images and videos of the environment 100 may be processed and analyzed locally in the integrated device 101 itself, thereby eliminating the need for transmitting the one or more captured images and videos to a computing platform such as a server. Thus, performing image analytics locally in the integrated device 101 results in reduced cost and enhanced speed of operations.

In some implementations, the one or more replaceable sensors 103 and the at least one programmable image/video capturing device 105 may be interfaced such that, the at least one programmable image/video capturing device 105 are activated to capture the one or more images and videos of the environment 100 upon detection of the one or more events by the one or more replaceable sensors 103. Alternatively, the at least one programmable image/video capturing device 105 may trigger the one or more replaceable sensors 103 to capture sensor data 104 related to the one or more events upon capturing the one or more images and videos of the one or more events.

In an embodiment, the processor 109 is associated with a co-processor 107. The co-processor 107 may be responsible for receiving the sensor data 104 from each of the one or more replaceable sensors 103. In an embodiment, the co-processor 107 may analyze the received sensor data 104 and compare values of the received sensor data 104 with a set of predetermined values to determine if there are any deviation in the values of the received sensor data 104.

Further, the co-processor 107 may be responsible for generating a suitable alarm and/or a notification to the users upon determining the deviation in the sensor data 104. As an example, suppose a temperature sensor in the integrated device 101 which is deployed in the environment 100 would continuously monitor the temperature of the environment 100 and transmit minute-by-minute recorded temperature data to the co-processor 107. Subsequently, the co-processor 107 would compare the received temperature data with the predetermined temperature value to determine the deviation in the temperature of the environment 100. Suppose, the predetermined temperature value is 30° Celsius. Here, if the recorded temperature value is more than the predetermined temperature value, say 31° Celsius, then the co-processor 107 would detect a deviation in the temperature value and would raise an alarm/siren through the speaker 213 or transmit a notification to the user for indicating the possibility of fire, smoke, or air conditioner failure or extreme heat in the environment 100. A correlated image/video would show that there is no fire or smoke and it is only an air conditioner failure.

In an embodiment, the processor 109 may be responsible for coordinating each of the one or more replaceable sensors 103, the co-processor 107, the at least one programmable image/video/audio capturing device 105 and other components in the integrated device 101. In some implementation, the processor 109 may be used to re-configure or program the at least one programmable image/video capturing device 105 as per the required application of monitoring.

As an example, suppose, initially the at least one programmable image/video capturing device 105 was configured with image analytics instructions that can detect occurrence of fire in the environment 100 by comparing the captured images and videos of the environment 100 with predetermined images of the environment 100. Subsequently, if the at least one programmable image/video capturing device 105 must be additionally configured for detecting an intrusion into the environment 100, then image analytics instructions that are necessary for intrusion detection may be programmed or configured onto the at least one programmable image/video capturing device 105 through at least one of an edge node 115A, a cloud server 115B, one or more user devices 115C or one or more sensor nodes associated with the integrated device 101 using the processor 109. As an example, the edge node 115A may include, without limiting to, an embedded edge/gateway node. The one or more user devices 115C may include, without limiting to, a personal computer, a laptop and/or a smartphone associated with the user. In an implementation, the user may flexibly modify the image capturing device 101 to monitor occurrence of one or more events of interest to the user by modifying the configurations of the at least one programmable image/video capturing device 105 through a mobile application running on the smartphone or any other user devices 115C associated with the user.

Additionally, the processor 109 may be responsible for correlating the sensor data 104 with data related to the one or more images and videos 106 for verifying and validating the occurrence of any event in the environment 100. Suppose, there is an event of 'Fire' in the environment 100. Here, the sensor data 104, which is obtained by the temperature sensor in the integrated device 101 deployed in the environment 100 would indicate a high range of temperature values.

Similarly, the one or more images and videos captured by the at least one programmable image/video capturing device 105 would indicate the occurrence of fire in the environment 100. Here, the processor 109 may correlate the sensor data 104 obtained from the temperature sensor with the data related to the one or more images and videos 106 received from the at least one programmable image/video capturing device 105 for validating the occurrence of fire in the environment 100. By correlating the sensor data 104 and the data related to the one or more images and videos 106, the processor 109 enhances the accuracy of surveillance/monitoring of the environment 100 and eliminates chances of false alarms or notifications provided to the users.

In an embodiment, the communication unit 113 may be responsible for transmitting event information 111 related to an event which has occurred in the environment 100 to at least one of the edge node 115A, the cloud server 115B or the one or more user devices 115C for further analysis and storage of the event information 111. The event information 111 includes the information related to the one or more events such as, name of the event occurred, total time elapsed after the occurrence of the event and the like. It is also possible that even when there is no external event, a periodic message (once in every 30 minutes) containing the sensor data 104 and the data related to the one or more images/videos 106 could be sent to one or more edge nodes 115A, the cloud server 115B, or the one or more user devices 115C. As an example, the communication unit 113 may include a wired network interface such as, an ethernet LAN or a gateway interface, and one or more wireless network interfaces, such as Wi-Fi and/or Wi-Fi hotspot interface, Bluetooth interface, Infrared interface, an application specific low-power wireless interface, and one of a 2G, 3G, 4G or any other compatible versions of wireless two-way communication interfaces. In some implementations, the communication unit 113 may also be used for transmitting one or more instructions and/or configuration details to the processor 109 from the edge node 115A, the cloud server 115B, the one or more user devices 115C or one or more sensor nodes associated with the integrated device 101.

In an implementation, the transmission of data and/or instructions between the processor 109, the edge node 115A, the cloud server 115B, the one or more user devices 115C, or the one or more sensor nodes associated with the integrated device 101 may be secured by an application specific secure packet service or standard Hyper Text Transfer Protocol Secure (HTTPS) protocol or any other security mechanism. The packet structure of the data and/or instructions may be determined based on open standards so that the integrated device 101 may be connected to an IoT gateway, a cloud application or any other third-party cloud applications and software.

In an embodiment, the notification unit 112 may be responsible for notifying the occurrence of the one or more events to a user associated with the integrated device 101 or to one or more persons concerned with the environment 100. The notification unit 112 may include, without limiting to, an alarm/siren, one or more Light Emitting Diodes (LED) indicators 211 and a speaker 213.

In some implementations, the integrated device 101 may be configured such that, the integrated device 101 acts as an IoT gateway as well. In such a scenario, in addition to monitoring of the environment 100, the integrated device 101 may also function as an IoT gateway by combining sensor data 104 and data related to the one or more images and videos 106 from each of the one or more replaceable sensors 103 and the programmable image/video capturing device 105 and then directly communicating the collected data with the cloud server 115B. It is also possible for authorized external sensors (not present physically on the integrated device) to communicate to the cloud servers through the IoT gateway on the integrated device 101 in a secure manner.

Figure 2A:
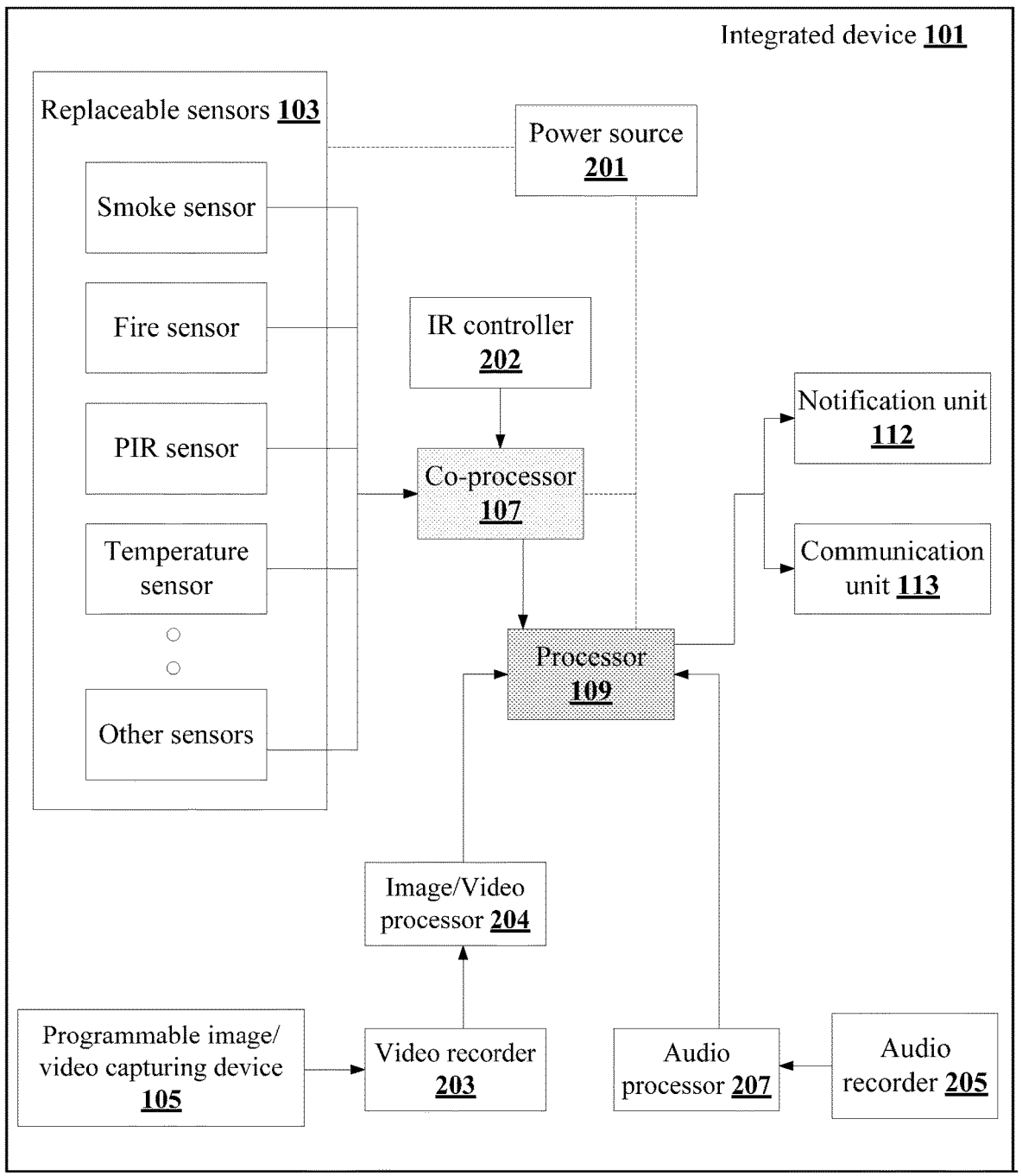
FIG. 2A shows a functional block diagram of the integrated device in accordance with some embodiments of the present disclosure.

FIG. 2A shows a functional block diagram of the integrated device 101 in accordance with some embodiments of the present disclosure.

As indicated in FIG. 2A each of the one or more replaceable sensors 103 are communicatively connected to the co-processor 107. The co-processor 107 receives the sensor data 104 from the one or more replaceable sensors 103 and processes the received sensor data 104 for determining the occurrence of the one or more events in the environment 100. Further, the co-processor 107 communicates the processed sensor data 104 to the processor 109 for correlating the sensor data 104 with the data related to the one or more images and videos 106, thereby validating the occurrence of the one or more events.

In an embodiment, the one or more images and videos captured by the at least one programmable image/video capturing device 105 may be processed by an image/video processor 204, which converts the one or more images into digital information format of the data related to the one or more images and videos 106. The data related to the one or more images and videos 106, which is in the form of digital information, is received by the processor 109 and is correlated with the sensor data 104 for validating the occurrence of the one or more events.

In an embodiment, the integrated device 101 may be configured with an audio recorder 205, such as a microphone, for capturing and recording one or more sounds in the environment 100 to determine occurrence of the one or more events. Further, the one or more sounds recorded by the audio recorder 205 are processed by an audio processor 207. The audio processor 207 converts the one or more recorded sounds into a digital format, which is subsequently transmitted to the processor 109 for determining occurrence of the one or more events. Further, the integrated device 101 may be configured with a video recorder for recording the one or more images and videos of the environment 100 and to subsequently transmit the recorded one or more images and videos to the processor 109 for further analysis and processing.

In an embodiment, the integrated device 101 may be configured with an Infrared (IR) controller 202. The IR controller 202 may be interfaced with the replaceable sensors 103 and the at least one programmable image/video capturing device 105 to operate and control one or more electronic devices, such as Televisions, Air conditioners and the like, present in the environment 100. For example, consider that the integrated device 101 is deployed in living room of the user. Suppose, the living room includes a Television (TV) and the user switches it on as soon as the user enters the living room. Later, the user may move out of the living room, without switching off the TV. However, the integrated device 101 would determine absence of the user in the living room based on the one or more images/videos captured by the at least one programmable image/video capturing device 105. Subsequently, the co-processor 107 in the integrated device 101 transmits a signal to the IR controller 202, indicating the absence of user in the living room. As a result, the IR controller 202 would automatically switch the TV off.

Thus, the integrated device 101, in addition to monitoring the one or more events in the environment 100, may also be used to operate and control one or more other devices in the environment 100 using the IR controller 202. Further, the integrated device 101 may be interfaced with a gateway network or a wireless communication interface to establish wireless connectivity with the one or more devices in the environment 100 and to control the operation of the one or more devices.

In an embodiment, the notification unit 112 may be responsible for notifying the occurrence of the one or more events to a user of the integrated device 101 or to one or more persons concerned with the environment 100. The notification unit 112 may include, without limiting to, an alarm/siren, one or more Light Emitting Diodes (LED) indicators 211 and a speaker 213. In an implementation, the integrated device 101 may be equipped with a set of multi-color LED indicators 211, such that each LED indicator 211 is associated with one or more events, so that the occurrence of the one or more events may be easily identified based on the color of the LED indicator 211 being lit. In an embodiment, the integrated device 101 may use the alarm and/or the speaker 213 to announce the occurrence of the one or more events to the user. In some implementations, the notification unit 112, through the communication unit 113, may transmit a suitable message to one or more user devices associated with the user for instantly notifying the user about the occurrence of the one or more events, so that the user is notified about the occurrence of the event even when the user is not present near the environment 100.

In an embodiment, the communication unit 113 may be responsible for exchanging data and/or instructions between the integrated device 101 and the edge node 115A, the cloud server 115B, the one or more user devices 115C or one or more sensor nodes associated with the integrated device 101. As an example, the communication unit 113 may include a wired network interface such as, an ethernet LAN or a gateway interface, and one or more wireless network interfaces, such as Wi-Fi and/or Wi-Fi hotspot interface, Bluetooth interface, Infrared interface, an application specific low-power wireless interface, and one of a 2G, 3G, 4G or any other compatible versions of wireless two-way communication interfaces.

In an embodiment, each of the one or more replaceable sensors 103, the at least one programmable image/video capturing device 105, the co-processor 107, the processor 109, the notification unit 112, the communication unit 113, and other components of the integrated device 101 are powered by a power source 201. In an implementation, the power source 201 may be configured to appropriately distribute required amount of power to each component of the integrated device 101. As an example, the power source 201 may include, without limiting to, an Alternate Current (A/C) power supply, a Direct Current (DC) power supply, a rechargeable battery, a solar based rechargeable battery, and the like. Further, the power source 201 may be configured to monitor and manage various cut-off parameters such as an over charging cut-off value during charge, an under-voltage cut-off value during discharge, a high temperature cut-off and the like to protect the power source 201 and the integrated device 101 from any electrical damage.

As per embodiments of the present disclosure, the at least one programmable image/video capturing device 105 in the integrated device 101 may be programmed in such a manner that, the image analytics, which is required to be performed on the one or more images of the environment 100 for detecting occurrence of the one or more events, is performed locally on the programmable image/video capturing device 105 itself. By performing the required image analytics locally on the programmable image/video capturing device 105, the integrated device 101 would reduce amount of bandwidth and other network resources that are required to transmit the one or more captured images and videos to central locations, such as the edge node 115A, the cloud server 115B, the one or more user devices 115C or the one or more sensor nodes associated with the integrated device 101, for performing image analytics on the one or more captured images and videos.

Further, the programmable image/video capturing device 105, in contrary to continuous monitoring of the environment 100, may be programmed to detect and capture the one or more images and videos of the environment 100 only during occurrence of one or more events that are related to a specific application of monitoring. For example, consider the integrated device 101 which is configured in premises of a school for monitoring behaviour and movement of each student in the school. Here, the programmable image/video capturing device 105 in the integrated device 101 may be customized to capture one or more images and videos of the school environment only during operating hours of the school, and to remain in a sleep mode during non-operating hours of the school. The above customization would reduce number of images and videos being captured by the programmable image/video capturing device 105, thereby reducing storage space required for storing the one or more captured images and videos and, also reducing amount of image analytics required to be performed.

In the above example, in addition to the programmable image/video capturing device 105, one or more replaceable sensors 103 may be configured in the school environment for enhancing accuracy of monitoring of the school environment. Here, the programmable image/video capturing device 105 may be interfaced with the one or more replaceable sensors 103 and may be configured to capture the one or more images and videos of the school environment in response to detection of an event by the one or more replaceable sensors 103. In other words, the one or more replaceable sensors 103 would initiate the programmable image/video capturing device 105 to capture images and videos of the school environment based on detection of an event in the school environment.

Figure 2B:
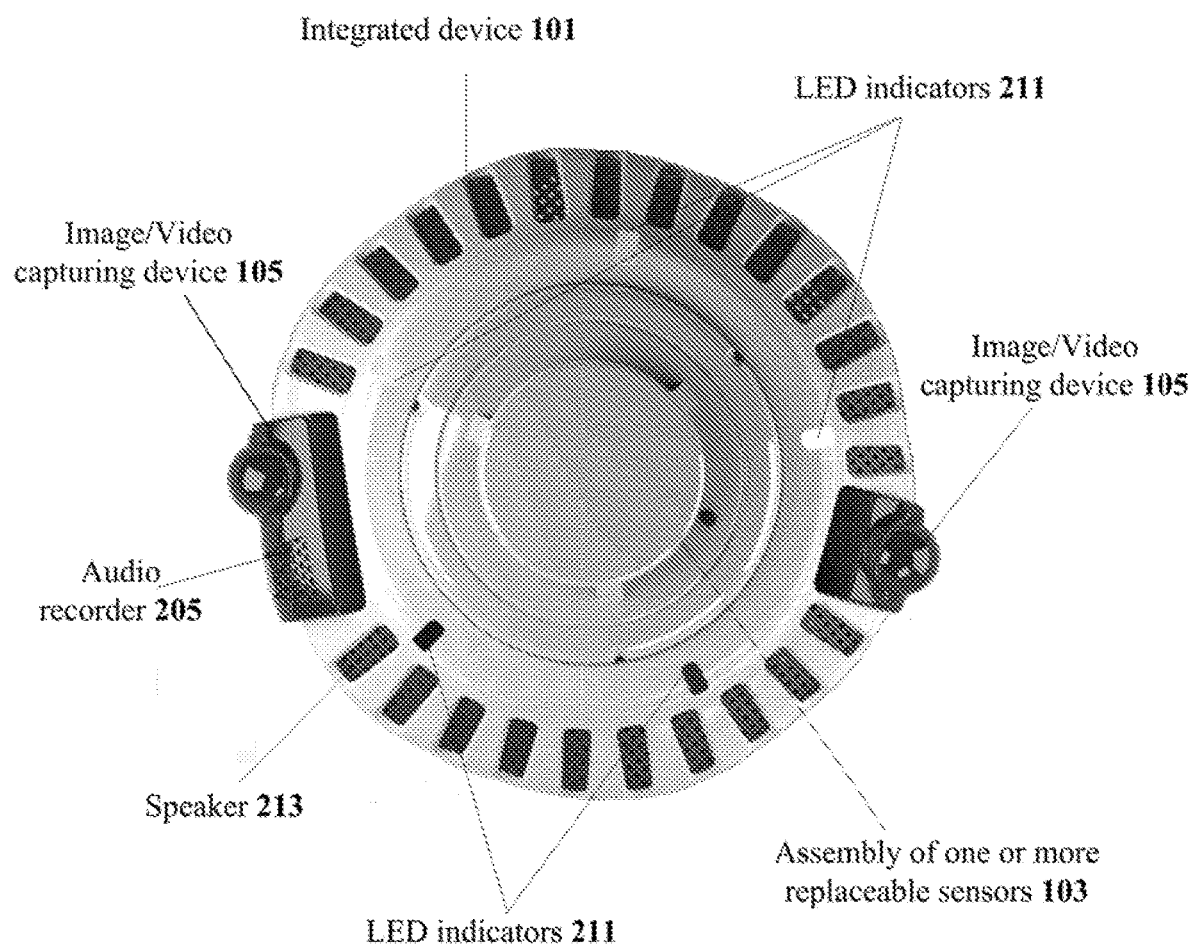
FIG. 2B shows an exemplary view of the integrated device in accordance with some embodiments of the present disclosure.

FIG. 2B shows a perspective view of the integrated device 101 in accordance with some embodiments of the present disclosure.

In some embodiments, the integrated device 101 may be designed in various physical configurations based on various chipset manufacturer platforms. Following are some of the physical configurations and/or forms in which the integrated device 101 may be deployed in an environment 100:

Roof mounted integrated device 101 (as shown in the FIG. 2B)

Wall mounted integrated device 101

Wall mounted integrated device 101 having additional sensors for monitoring indoor air quality.

Pole mounted integrated device 101 for outdoor applications like management of smart cities, traffic management and telecom service.

Solar powered integrated device 101 for remote, unmanned locations like remote traffic signals, agricultural fields for crop management and the like.

Specially engineered, application specific integrated device 101.

FIG. 2B shows a bottom view of a roof mounted integrated device 101. The one or more replaceable sensors 103 are integrated together into a single assembly of sensors, which are internally connected to the co-processor 107 and the processor 109 (not seen in FIG. 2B). The at least one programmable image/video capturing device 105 may be configured on either side of the integrated device 101, such that maximum region of the environment 100 is under the coverage of the at least one programmable image/video capturing device 105. The multi-color LED indicators 211 may be configured on the outer surface of the integrated device 101, such that the LED indicators 211 are clearly visible when they are lighted up due to occurrence of an event in the environment 100. The representation of the integrated device 101 in FIG. 2B is not definitive and the actual structure/configuration of the integrated device 101 may be modified based on convenience, number, and type of replaceable sensors 103, application of surveillance/monitoring, nature of the environment 100 and other factors.

Figure 3:
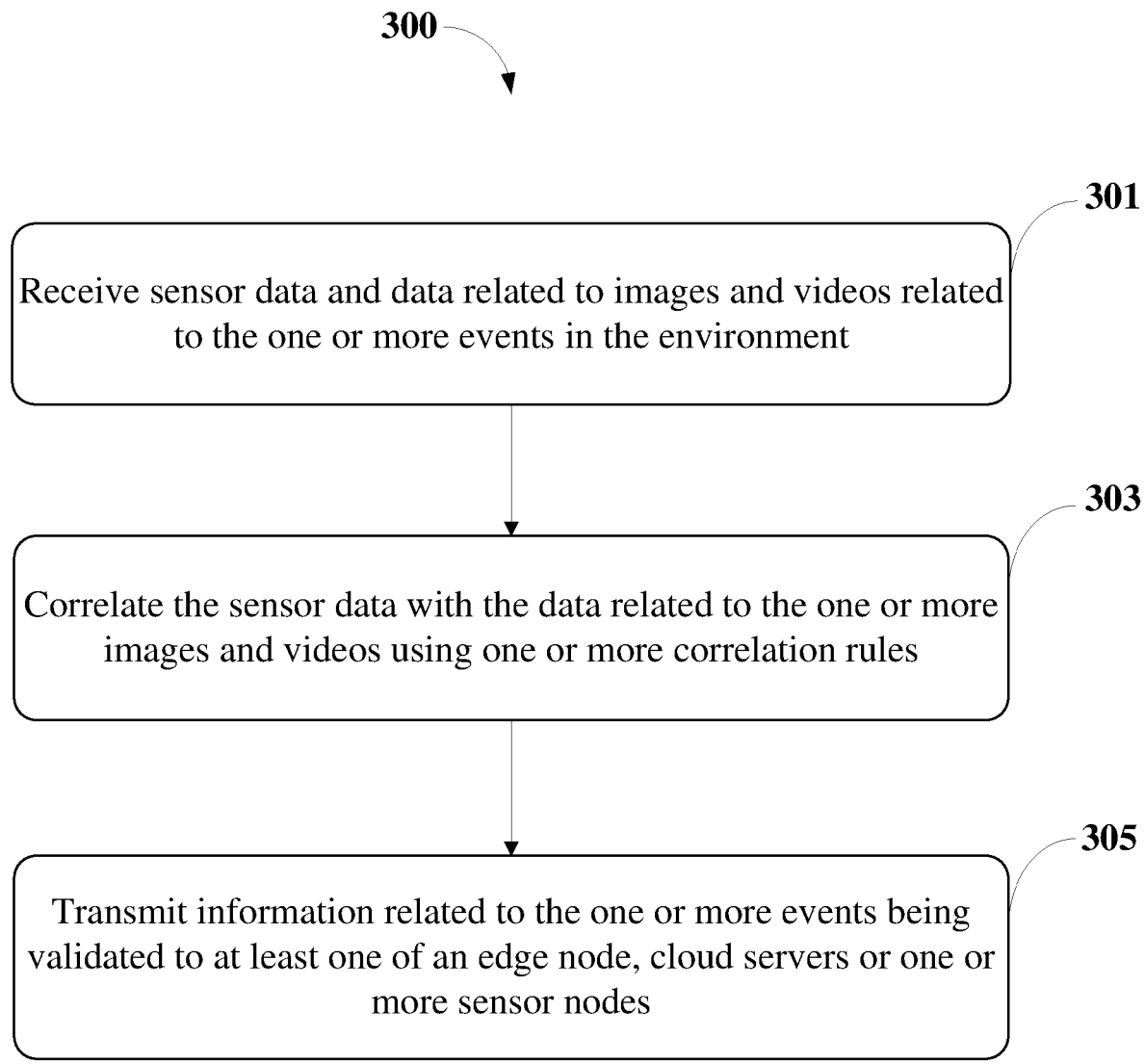
FIG. 3 shows a flowchart illustrating a method for monitoring and controlling one or more events in an environment in accordance with some embodiments of the present disclosure.

FIG. 3 shows a flowchart illustrating a method for monitoring and controlling one or more events in an environment 100 in accordance with some embodiments of the present disclosure.

As illustrated in FIG. 3, the method 300 includes one or more blocks illustrating a method for monitoring and controlling one or more events in an environment 100 using an integrated device 101. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes receiving, by a processor 109 of the integrated device 101, sensor data 104 and data related to the one or more images and videos 106 related to the one or more events from the one or more replaceable sensors 103 and the at least one programmable image/video capturing device 105 respectively. The one or more replaceable sensors 103 may be configured for detecting the one or more events in the environment 100. As an example, the one or more replaceable sensors 103 may include, without limiting to, a smoke detection sensor, a fire detection sensor, a Passive Infrared (PIR) sensor, air condition controlling module, a temperature sensor, a humidity sensor, a noise sensor, a door sensor, an occupancy detection sensor, a light sensor, or a motion sensor. In an embodiment, at least one programmable image/video capturing device 105 may be interfaced with the one or more replaceable sensors 103 and may be configured to capture one or more images and videos of the environment 100 in real-time.

In an implementation, the one or more replaceable sensors 103 and the at least one programmable image/video capturing device 105 may be interfaced such that, the at least one programmable image/video capturing device 105 are activated to capture the one or more images and videos of the environment 100 upon detection of the one or more events by the one or more replaceable sensors 103. Further, the at least one programmable image/video capturing device 105 may trigger the one or more replaceable sensors 103 to capture sensor data 104 related to the one or more events upon capturing the one or more images and videos of the one or more events.

In an embodiment, the occurrence of the one or more events may be validated using the data related to the one or more images and videos 106. The at least one programmable image/video capturing device 105 may be configured to continuously monitor and capture one or more images and videos of an environment 100, in which the integrated device 101 is deployed. Suppose, a 'Fire' event has occurred in the environment 100. Here, the integrated device 101 would detect occurrence of the 'Fire' event in the environment 100 by performing image analytics on the one or more images and/or videos of the environment 100. Thus, the integrated device 101 can detect and validate occurrence of the one or more events based on the one or more images of the environment 100.

At block 303, the method 300 includes correlating, by the processor 109, the sensor data 104 with the data related to the one or more images and videos 106 using one or more correlation rules to validate occurrence of the one or more events. In some embodiments, the one or more are correlation rules are one or more preconfigured correlation rules obtained from the edge node 115A, the cloud server 115B or through the one or more user devices 115C. In other embodiments, the one or more correlation rules are one or more dynamic correlation rules obtained in real-time based on self-learning from historical correlation data.

For example, a smoke sensor in the integrated device 101 may be configured with a preconfigured correlation rule to detect and verify the occurrence of smoke or fire in the environment 100. Initially, the smoke sensor may detect the presence of smoke and notify the co-processor 107 about presence of smoke in the environment 100. Subsequently, the co-processor 107 may use the preconfigured correlation rule to verify presence of smoke in the environment 100 based on the one or more images/videos of the environment 100, captured in real-time, by the at least one programmable image/video capturing device 105. Suppose, the one or more images/videos show the presence of smoke in the environment 100, then the occurrence of smoke in the environment 100 is verified and confirmed. Alternatively, if the one or more images/videos show presence of fire, then the occurrence of fire is confirmed in the environment 100. In each of the above circumstances, i.e. occurrence of smoke or fire, the co-processor 107 may produce an alarm/notification to the user through the processor 109.

On the other hand, if the one or more images/videos does not show signs of both smoke and fire in the environment, then the co-processor 107 treats the detection of smoke in the environment 100 to be a false event. The embodiments of the above example are not limited to combination of the smoke sensor and the programmable image/video capturing device 105. Instead, the programmable image/video capturing device 105 may be interfaced with any other replaceable sensor 103 in the integrated device 101 to verify and confirm the occurrence of various events in the environment 100. Hence, the above arrangement helps in reducing and/or eliminating false alarms or notifications related to occurrence of events in the environment 100.

In an implementation, the processor 109 further comprises notifying the occurrence of the one or more events to a user associated with the environment 100 through one or more user devices associated with the user, using a notification unit 112 associated with the integrated device 101. As an example, the notification unit 112 may include, without limiting to, at least one of one or more programmable Light Emitting Diode (LED) indicators 211, an alarm or a speaker 213.

At block 305, the method 300 includes transmitting, by the processor 109, information related to the one or more events being validated to at least one of an edge node 115A, cloud server 115B, the one or more user devices 115C or one or more sensor nodes associated with the integrated device 101. Additionally, the integrated device 101 may be configured to transmit the event information 111 to one or more users of the integrated device 101 and/or to one or more persons concerned with the environment 100.

In an embodiment, each of the one or more replaceable sensors 103 may be interfaced with the processor 109 and a memory configured in the integrated device 101 using a co-processor 107 communicatively coupled to the processor 109 and each of the one or more replaceable sensors 103. The co-processor 107 may be responsible for interfacing each of the one or more replaceable sensors 103 with the processor and the memory, and to analyze digital information obtained from a signal processing unit for detecting the occurrence of the one or more events. The signal processing unit may be configured for processing the sensor data 104 and the data related to the one or more images and videos 106 before transmitting the sensor data 104 and the data related to the one or more images and videos 106 to the co-processor 107.

In an embodiment, the information related to the one or more events may be transmitted to at least one of the edge node 115A, the cloud server 115B, the one or more sensor nodes associated with the integrated device 101 or one or more user devices 115C associated with the user using a communication unit 113 configured in the integrated device 101. Further, the integrated device 101 may comprise a data recorder, which may be configured to record and store the sensor data 104 and the data related to the one or more images and videos 106 on a memory of the integrated device 101 when there are no communication interfaces available in the environment 100 for transmitting the recorded data to the cloud server 115B. The data stored on the data recorder may be transmitted to the cloud server 115B as soon as the communication interface are available in the environment 100. The data may be stored for backup purposes as well even when the communication interfaces are available.

In an implementation, the recorded data may be transmitted between the at least one of the edge node 115A, the cloud server 115B, the one or more user devices 115C or the one or more sensor nodes associated with the integrated device 101, and each of the one or more replaceable sensors 103 using a low power wireless transceiver configured in the integrated device 101.

In an embodiment, the processor 109 in the integrated device 101 may be further configured to record audio information in the environment 100 using an audio recorder 205 configured in the integrated device 101. In some implementations, the integrated device 101 may be powered using a power source 201. As an example, the power source 201 may include, without limiting to, at least one of a rechargeable battery, a power generator, or a replaceable battery.

In some implorations, the integrated device 101 may be deployed in one or more forms selected from at least one of a roof mounted form, wall mounted form, or a pole mounted form in at least one of an indoor environment or an outdoor environment. In other implementations, the integrated device 101 may be configured as an Internet of Things (IoT) gateway to combine and transmit the sensor data 104 and the data related to the one or more images and videos 106 to the cloud server 115B. Hence, the integrated device 101, as an IoT gateway, facilitates the one or more detached sensors and the one or more detached programmable image/video capturing device 105 to transmit the sensor data 104 and the data related to the one or more images and videos 106 to the cloud server 115B.

System Architecture:

In an implementation, the processor 109 may include at least one data processor for executing program components consistent with the present disclosure. The processor 109 may also include specialized processing units such as integrated system (bus) controllers, memory management control units, floating point units, graphics processing units, digital signal processing units, and the like, which are necessary within the scope of the present disclosure.

Also, the processor 109 may be disposed in communication with one or more user devices via an I/O interface associated with the communication unit 113. The I/O interface may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like.

The communication unit 113 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, and the like. In an implementation, using the communication unit 113, the integrated device 101 may communicate with at least one of an edge node 115A, a cloud server 115B, the one or more user devices 115C or one or more sensor nodes associated with the integrated device 101 for transmitting information related to the one or more events being validated in the environment 100.

In some embodiments, the processor 109 may be disposed in communication with a memory (e.g., a RAM, or a ROM, via a storage interface. The storage interface may connect to the memory by employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, and the like.

Furthermore, one or more computer-readable storage media may be utilized in implementing embodiments consistent with the present invention. A computer-readable storage medium refers to any type of physical memory on which information or data readable by the processor 109 or the co-processor 107 may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory.

Advantages of the Embodiment of the Present Disclosure are Illustrated Herein.

In an embodiment, the present disclosure discloses an Internet of Things (IoT) based integrated device for real-time monitoring of one or more events occurring in an environment.

In an embodiment, the integrated device of the instant disclosure integrates a programmable image/video capturing device with the one or more sensors, thereby providing a proof for the actual event detected by the sensors. Hence, the integrated device enhances the quality of sensor data, improves reliability, and provides better value to the users.

In an embodiment, the programmable image/video capturing device used in the integrated device can be locally configured to perform analytics of images of the environment to detect occurrence of events, thereby eliminating need for transmitting the captured images and videos to cloud server, edge nodes or one or more sensor nodes associated with the integrated device for analytics.

In an embodiment, the integrated device of the present disclosure allows users to easily add and/or remove any sensor unit from a design perspective of the integrated device, whenever a required monitoring application must be met.

In an embodiment, the integrated device of the present disclosure integrates various sensors, so that correlation of data between the sensors is easier and automatic actions can be taken easily. The correlation between the sensors helps in reducing false alarms.

In an embodiment, the integrated device of the present disclosure eliminates/reduces electric wiring between the sensors, thereby improving ease of installation and commissioning of the device, increasing reliability of surveillance/monitoring of an environment, and reducing the electrical wiring, and maintenance costs for the users.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Integrated device |
| 103 | Replaceable sensors |
| 104 | Sensor data |
| 105 | Programmable image/video capturing device |
| 106 | Data related to images and videos |
| 107 | Co-processor |
| 109 | Processor |
| 111 | Event information |
| 112 | Notification unit |
| 113 | Communication unit |
| 115A | Edge node |
| 115B | Cloud server |
| 115C | User devices |
| 201 | Power source |

-continued

| Reference Number | Description |
| --- | --- |
| 202 | IR controller |
| 203 | Video recorder |
| 204 | Image/Video processor |
| 205 | Audio recorder |
| 207 | Audio processor |
| 211 | LED indicators |
| 213 | Speaker |

The invention claimed is:

1. An Internet of Things (IoT) based integrated device to monitor and control one or more events in an environment, the integrated device comprises:
a housing comprising:
one or more replaceable sensors including a smoke detection sensor, a fire detection sensor, a Passive Infrared (PIR) sensor, an air condition controlling module, a temperature sensor, a humidity sensor, a noise sensor, a door sensor, and an occupancy detection sensor, wherein at least one of the smoke detection sensor, the fire detection sensor, the Passive Infrared (PIR) sensor, the air condition controlling module, the temperature sensor, the humidity sensor, the noise sensor, the door sensor, and the occupancy detection sensor detects the one or more events in the environment;
at least one programmable image or video capturing device, interfaced with at least one of the smoke detection sensor, the fire detection sensor, the Passive Infrared (PIR) sensor, the air condition controlling module, the temperature sensor, the humidity sensor, the noise sensor, the door sensor, and the occupancy detection sensor, to capture one or more images and videos of the environment in real-time, wherein the at least one programmable image or video capturing device is activated to capture the one or more images and videos of the environment only upon detection of the one or more events by at least one of the smoke detection sensor, the fire detection sensor, the Passive Infrared (PIR) sensor, the air condition controlling module, the temperature sensor, the humidity sensor, the noise sensor, the door sensor, and the occupancy detection sensor;
a processor communicatively connected to each of the smoke detection sensor, the fire detection sensor, the Passive Infrared (PIR) sensor, the air condition controlling module, the temperature sensor, the humidity sensor, the noise sensor, the door sensor, and the occupancy detection sensor and the at least one programmable image or video capturing device; and
a memory, communicatively coupled to the processor, wherein the memory stores processor-executable instructions, which on execution, cause the processor to:
receive sensor data and data related to the one or more images and videos related to the one or more events from at least one of the smoke detection sensor, the fire detection sensor, the Passive Infrared (PIR) sensor, the air condition controlling module, the temperature sensor, the humidity sensor, the noise sensor, the door sensor, and the occupancy detection sensor and the at least one programmable image or video capturing device respectively;

correlate the sensor data with the data related to the one or more images and videos using one or more correlation rules to validate occurrence of the one or more events; and transmit information related to the one or more events to at least one of an edge node, a cloud server, one or more user devices, or one or more sensor nodes associated with the integrated device, upon validation of occurrence of the one or more events.

2. The integrated device as claimed in claim 1, wherein the processor uses the data related to the one or more images and videos for validating the occurrence of the one or more events.

3. The integrated device as claimed in claim 1, wherein the one or more replaceable sensors further includes a motion sensor.

4. The integrated device as claimed in claim 1, further comprising a notification unit associated with the processor to notify the occurrence of the one or more events to a user associated with the environment through the one or more user devices associated with the user.

5. The integrated device as claimed in claim 4, wherein the notification unit comprises at least one of one or more programmable Light Emitting Diodes (LEDs) indicators, an alarm or a speaker.

6. The integrated device as claimed in claim 1, further comprising a signal processing unit to process the sensor data and the data related to the one or more images and videos before transmitting the sensor data and the data related to the one or more images and videos to the processor.

7. The integrated device as claimed in claim 1, wherein the at least one programmable image or video capturing device triggers the one or more replaceable sensors to capture sensor data related to the one or more events upon capturing the one or more images and videos of the one or more events.

8. The integrated device as claimed in claim 1, wherein the one or more correlation rules are at least one of one or more preconfigured correlation rules obtained from the cloud server and the edge node or one or more dynamic correlation rules obtained in real-time based on self-learning from historical correlation data.

9. The integrated device as claimed in claim 1, further comprising a co-processor, communicatively coupled to the processor, the signal processing unit and each of the one or more replaceable sensors, to interface each of one or more replaceable sensors with the processor and the memory, and to analyze the digital information obtained from the signal processing unit to detect occurrence of the one or more events.

10. The integrated device as claimed in claim 1, wherein the integrated device is configured as an IoT gateway to combine and transmit the sensor data and the data related to the one or more images and videos to the cloud server.

11. The integrated device as claimed in claim 1, wherein the integrated device is configured as an IoT gateway to facilitate one or more detached sensors and one or more detached programmable image or video capturing device to transmit the sensor data and the data related to the one or more images and videos to the cloud server transparently.

12. The integrated device as claimed in claim 1, further comprising an image and video recorder and an audio recorder to record one or more images, videos, and audio of the environment and to transmit the recorded one or more images, videos and audio to the processor.

13. The integrated device as claimed in claim 1, further comprising a data recorder to record and store the sensor data, the data related to the one or more images and videos and data related to audio on the memory when no communication interfaces are available in the environment or to transmit the recorded sensor data and the data related to the one or more images and videos to the cloud server when a communication interface is available in the environment.

14. The integrated device as claimed in claim 1, further comprising a communication unit (113) to transmit information related to the one or more events to at least one of the edge node, the cloud server, or the one or more user devices associated with a user associated with the environment.

15. The integrated device as claimed in claim 1, further comprising a low power wireless transceiver to receive and transmit data between at least one of the edge node, one or more detached sensors, the cloud server, the one or more user devices, and each of the one or more replaceable sensors.

16. The integrated device as claimed in claim 1, further comprising a power source to power the integrated device.

17. The integrated device as claimed in claim 16, wherein the power source is at least one of a rechargeable battery, a power generator, or a replaceable battery.

18. The integrated device as claimed in claim 1, wherein the integrated device is deployed in one or more forms selected from at least one of a roof mounted form, wall mounted form, or a pole mounted form in at least one of an indoor environment or an outdoor environment.

19. The integrated device as claimed in claim 1, further comprising an Infrared (IR) controller to communicate and control one or more electronic devices deployed in the environment.

20. A method for monitoring and controlling one or more events in an environment, the method comprising:
providing an integrated device comprising:
a housing comprising:
a smoke detection sensor, a fire detection sensor, a Passive Infrared (PIR) sensor, an air condition controlling module, a temperature sensor, a humidity sensor, a noise sensor, a door sensor, and an occupancy detection sensor, wherein at least one of the smoke detection sensor, the fire detection sensor, the Passive Infrared (PIR) sensor, the air condition controlling module, the temperature sensor, the humidity sensor, the noise sensor, the door sensor, and the occupancy detection sensor detects one or more events in the environment;
at least one programmable image or video capturing device, interfaced with at least one of the smoke detection sensor, the fire detection sensor, the Passive Infrared (PIR) sensor, the air condition controlling module, the temperature sensor, the humidity sensor, the noise sensor, the door sensor, and the occupancy detection sensor, to capture one or more images and videos of the environment in real-time, wherein the at least one programmable image or video capturing device is activated to capture the one or more images and videos of the environment only upon detection of the one or more events by at least one of the smoke detection sensor, the fire detection sensor, the Passive Infrared (PIR) sensor, the air condition controlling module, the temperature sensor, the humidity sensor, the noise sensor, the door sensor, and the occupancy detection sensor;
a processor communicatively connected to each of the smoke detection sensor, the fire detection sensor, the Passive Infrared (PIR) sensor, the air condition controlling module, the temperature sensor, the humidity sensor, the noise sensor, the door sensor, and the occupancy detection sensor and the at least one programmable image or video capturing device; and
a memory, communicatively coupled to the processor, wherein the memory stores processor-executable instructions, which on execution, cause the processor to:
  receive sensor data and data related to the one or more images and videos related to the one or more events from at least one of the smoke detection sensor, the fire detection sensor, the Passive Infrared (PIR) sensor, the air condition controlling module, the temperature sensor, the humidity sensor, the noise sensor, the door sensor, and the occupancy detection sensor and the at least one programmable image or video capturing device respectively;
  correlate the sensor data with the data related to the one or more images and videos using one or more correlation rules to validate occurrence of the one or more events; and
  transmit information related to the one or more events to at least one of an edge node, a cloud server, one or more user devices, or one or more sensor nodes associated with the integrated device, upon validation of occurrence of the one or more events;
receiving, by a processor of the integrated device, sensor data and data related to the one or more images and videos related to the one or more events from one or more of the smoke detection sensor, a fire detection sensor, a Passive Infrared (PIR) sensor, an air condition controlling module, a temperature sensor, a humidity sensor, a noise sensor, a door sensor, and an occupancy detection sensor and at least one programmable image or video capturing device respectively,
  wherein the smoke detection sensor, fire detection sensor, Passive Infrared (PIR) sensor, air condition controlling module, temperature sensor, humidity sensor, noise sensor, door sensor, and occupancy detection sensor are configured to detect the one or more events in the environment,
  wherein at least one programmable image or video capturing device is interfaced with one or more of the smoke detection sensor, fire detection sensor, Passive Infrared (PIR) sensor, air condition controlling module, temperature sensor, humidity sensor, noise sensor, door sensor, and occupancy detection sensor and is configured to capture one or more images and videos of the environment in real-time, wherein the at least one programmable image or video capturing device is activated to capture the one or more images and videos of the environment only upon detection of the one or more events by the one or more replaceable sensors;
correlating, by the processor, the sensor data with the data related to the one or more images and videos using one or more correlation rules for validating occurrence of the one or more events; and
transmitting, by the processor, information related to the one or more events validated to at least one of an edge node, a cloud server, one or more user devices, or one or more sensor nodes associated with the integrated device, upon validation of occurrence of the one or more events.

21. The method as claimed in claim 20, wherein the occurrence of the one or more events is validated using the data related to the one or more images and videos.

22. The method as claimed in claim 20, wherein the integrated device further includes a motion sensor.

23. The method as claimed in claim 20, further comprising notifying the occurrence of the one or more events to a user associated with the environment through the one or more user devices associated with the user using a notification unit associated with the integrated device.

24. The method as claimed in claim 23, wherein the notification unit comprises at least one of one or more programmable Light Emitting Diodes (LEDs) indicators, an alarm or a speaker.

25. The method as claimed in claim 20, further comprising processing the sensor data and the data related to the one or more images and videos using a signal processing unit, associated with the integrated device, before transmitting the sensor data and the data related to the one or more images and videos to the processor.

26. The method as claimed in claim 20, wherein one or more of the smoke detection sensor, fire detection sensor, Passive Infrared (PIR) sensor, air condition controlling module, temperature sensor, humidity sensor, noise sensor, door sensor, and occupancy detection sensor are triggered by the at least one programmable image or video capturing device for capturing sensor data related to the one or more events upon capturing the one or more images and videos of the one or more events.

27. The method as claimed in claim 20, wherein the one or more correlation rules are at least one of one or more preconfigured correlation rules obtained from the cloud server, the edge node or the one or more User device, or one or more dynamic correlation rules obtained in real-time based on self-learning from historical correlation data.

28. The method as claimed in claim 20, further comprising interfacing each of the smoke detection sensor, fire detection sensor, Passive Infrared (PIR) sensor, air condition controlling module, temperature sensor, humidity sensor, noise sensor, door sensor, and occupancy detection sensor with a processor and a memory configured in the integrated device, and analyzing information obtained from the signal processing unit using a co-processor communicatively coupled to the processor, a signal processing unit, and each of the sensors.

29. The method as claimed in claim 20, further comprising configuring the integrated device as an IoT gateway for combining and transmitting the sensor data and the data related to the one or more images and videos to the cloud server.

30. The method as claimed in claim 20, further comprising configuring the integrated device as an IoT gateway for facilitating one or more detached sensors and one or more detached programmable image or video capturing device in transmitting the sensor data and the data related to the one or more images and videos to the cloud server.

31. The method as claimed in claim 20, further comprising recording one or more images and videos of the environment and transmitting the recorded one or more images and videos to the processor using an image and video recorder or an audio recorder associated with the integrated device.

32. The method as claimed in claim 20, further comprising recording the sensor data and the data related to the one or more images and videos using a data recorder associated with the integrated device, wherein the data recorder comprises:
- storing the recorded sensor data, the data related to the one or more images and videos and data related to audio on the memory when no communication interfaces are available in the environment; or
- transmitting the recorded sensor data and the data related to the one or more images and videos to the cloud server when a communication interface is available in the environment.

33. The method as claimed in claim 20, further comprising transmitting information related to the one or more events to at least one of the edge node, the cloud server, or one or more user devices associated with a user associated with the environment using a communication unit (113) configured in the integrated device.

34. The method as claimed in claim 20, further comprising receiving and transmitting data between at least one of the edge node, the cloud server, one or more detached sensors, the one or more user devices, and each of the one or more replaceable sensors using a low power wireless transceiver configured in the integrated device.

35. The method as claimed in claim 20, wherein the integrated device is powered using a power source comprising at least one of a rechargeable battery, a power generator, an external power source or a replaceable battery.

36. The method as claimed in claim 20, wherein the integrated device is deployed in one or more forms selected from at least one of a roof mounted form, wall mounted form, or a pole mounted form in at least one of an indoor environment or an outdoor environment.

* * * * *